Nov. 19, 1940.  E. COOKENBOO  2,222,404
VEHICLE BUMPER
Filed Aug. 23, 1938
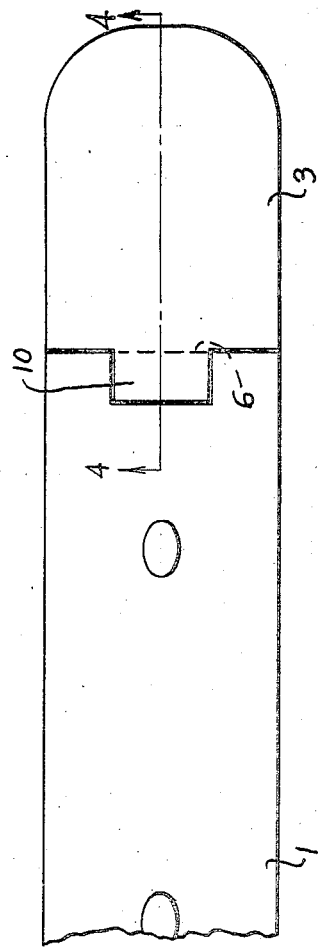
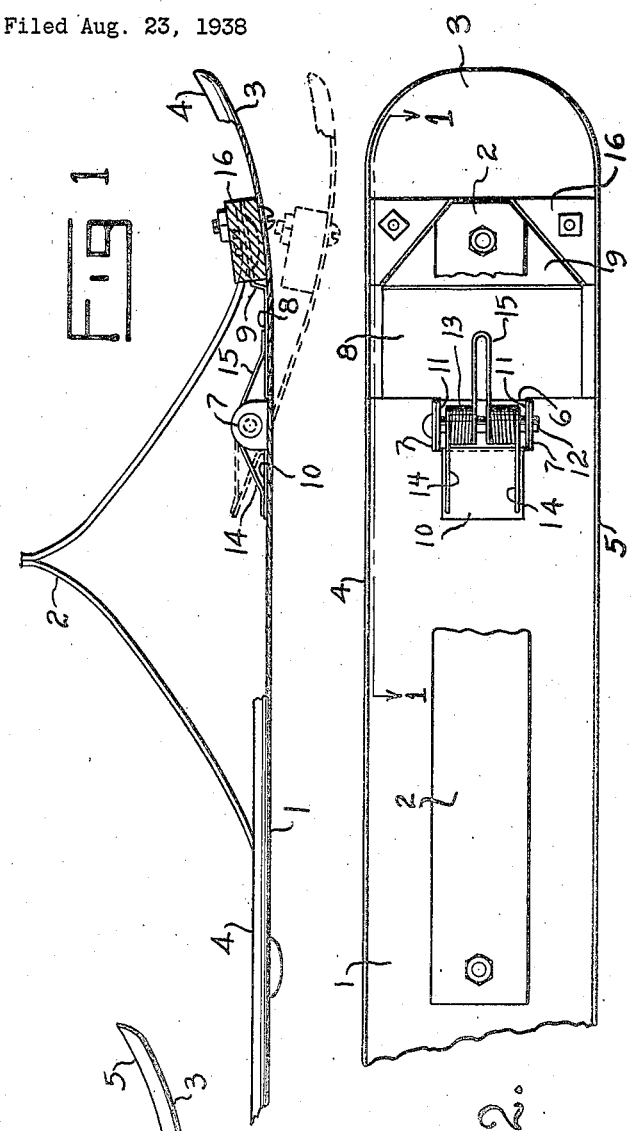
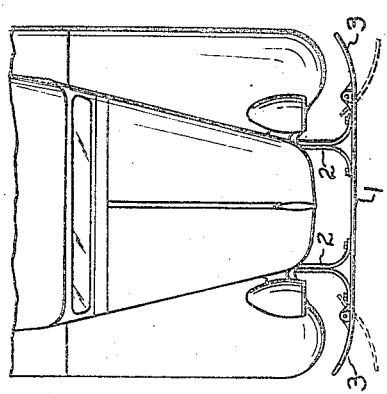
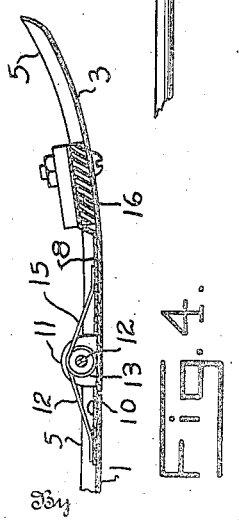
Inventor
ELWOOD COOKENBOO
By Edward V. Hardway
Attorney Patented Nov. 19, 1940

2,222,404

UNITED STATES PATENT OFFICE 2,222,404

VEHICLE BUMPER

Elwood Cookenboo, Houston, Tex.

Application August 23, 1938, Serial No. 226,210

2 Claims. (Cl. 293—55)

This invention relates to a vehicle bumper.

It is an object of the invention to provide a bumper for motor vehicles whose ends are mounted to readily yield in a direction away from the vehicle but which are firmly anchored to take direct shocks toward the vehicle so as to perform the usual function of the bumper in protecting the vehicle, particularly the fenders of the vehicle to which the bumper is attached.

As is well known the ends of the bumpers of passing vehicles sometimes become interlocked and in such case if the bumpers are rigidly formed of one piece either one or both bumpers are liable to be torn loose from their anchorage or, in the case of swift moving vehicles, one or both of them may be thrown from the road thus causing serious accidents. At times a swiftly moving vehicle, in passing a slower moving one, will turn so closely in front of the slow moving vehicle that the end of the rear bumper of the vehicle moving in front will interlock with the adjacent end of the vehicle being passed. In such a case if the bumpers are unyielding damages and an accident is likely to occur.

It is an object of the present invention to provide a bumper whose ends are mounted to yield, under circumstances such as above detailed, to prevent injury or accidents.

At times in parking a vehicle at a curb an end of the bumper often becomes engaged with the curb or other stationary objects so as to make it difficult or impossible to back away from the curb. In such a case if the end of the bumper is yieldably mounted, as hereinafter explained, the car may be backed into the street or road without difficulty or injury.

With the above and other objects in view the invention has particular relation to certain novel features of construction, arrangement of parts and use, an example of which is given in this specification and illustrated in the accompanying drawing, wherein:

Figure 1 shows a fragmentary plan view of a bumper, partly in section, taken on the line 1—1 of Figure 2.

Figure 2 shows a fragmentary, rear elevation.

Figure 3 shows a fragmentary, front elevation.

Figure 4 shows a sectional view taken on the line 4—4 of Figure 3, and

Figure 5 shows a plan view showing a bumper attached to a motor vehicle.

Referring now more particularly to the drawing, wherein like numerals of reference designate the same parts in each of the figures, the numeral 1 designates the main body of the bumper of any conventional construction which may be firmly anchored to either the front or the rear end of the vehicle chassis by the brackets as 2, 2, said bumper extending transversely of the vehicle and spaced from the fenders in the usual way. The ends 3, 3 of the bumper are in substantial alignment with the main body 1 and the upper and lower margins 4, 5 are retracted, or rearwardly curved, as indicated in Figures 1 and 4 so as to give the desired contour to the complete bumper and to increase its strength and rigidity.

At each end the main body 1 has a rectangular opening 6 therethrough and at each end of said opening has the outstanding lugs 7, 7. The main body 1 is extended each way beyond the corresponding opening 6 thus forming the end extensions 8 which are reduced somewhat in width as shown in Figure 2. The extremity 9 of each extension 8 is inwardly offset, as shown in Figure 1, and tapered on each side as illustrated in Figure 2, and to said extremity one arm of the corresponding bracket is attached, for strength, as shown in Figure 1.

The inner end of each end portion 3 is also reduced in width forming the tongues as 10 which are fitted through the openings 6 from in front. Each tongue 10 has the outstanding lugs 11 which fit against the inner sides of the lugs 7 and coincide therewith as shown in Figure 2 and a pin 12 is fitted through aligned bearings of the lugs 7, 11 thus forming a hinged connection.

Surrounding the pin 12 between the lugs 11 there is a coil spring 13. The ends 14 and 15 of this spring are extended each way and press, respectively, against the rear, or inner side of the tongue 10 end of the extension 8 so as to hold each end 3 in proper alignment with the main body portion 1.

Secured on the rear, or inner, side of each end portion 3 there is a bumper 16 preferably formed of rubber and whose outer face is shaped to receive the outer, or tapered, end of the offset portion 9 of the extension 8 when the said ends are in their normal, or aligned, positions with relation to the main body 1.

It will be noted that should either end portion 3 receive a thrust, the force of which is toward the vehicle the said ends will not yield in that direction but will function in the usual manner of a bumper to protect the fenders; however, said ends will yield in a direction from the vehicle so as to permit the interlocking ends of bumpers of different vehicles to readily yield and pass without injury to the bumpers and without danger of an accident to, or overturning of, either of said vehicles.

It is obvious that various mechanical changes or modifications may be made in the construction of the bumper without departing from the principle of the invention and while the drawing and description disclose what is now considered to be a preferred form of the invention this is by way of illustration only, while the broad principle of the invention will be defined by the appended claims.

What I claim is:

1. A vehicle bumper formed of an intermediate section having a rectangular opening adjacent each end thereof, upstanding lugs on the section adjacent said opening, the ends of the intermediate section extending outwardly beyond the corresponding openings and forming braces, end sections whose inner ends are reduced in width and fitted through said openings and extending inwardly beyond the openings forming braces, upstanding lugs on the reduced portions of the end sections pivotally connected to the lugs on the intermediate section, yieldable means normally holding the end sections in alignment with the intermediate section, said braces of the end sections fitting the inner side of the intermediate section and the end sections fitting against the outer sides of the extended ends of the intermediate section when in said aligned position, the end sections being mounted to yield, relative to the intermediate section, in one direction only, said braces forming means to limit the movement of the end sections relative to the intermediate section in the other direction, means for connecting the end of the extended brace and the intermediate portion of the intermediate section to a support, and resilient cushions interposed between the end sections and the extended braces of the intermediate section.

2. A vehicle bumper formed of an intermediate section having an opening adjacent each end thereof, the ends of the intermediate section extending outwardly beyond the corresponding openings and forming braces, end sections whose inner ends are reduced in width and fitted through said openings and extending inwardly beyond the openings forming braces, means pivotally connecting the end sections to the intermediate section, yieldable means normally holding the end sections in alignment with the intermediate section, said braces of the end sections fitting the inner side of the intermediate section and the end sections fitting against the outer sides of the extended ends of the intermediate section when in said aligned position, the end sections being mounted to yield, relative to the intermediate section, in one direction only, said braces forming means to limit the movement of the end sections relative to the intermediate section in the other direction, means for connecting the end of the extended brace and the intermediate portion of the intermediate section to a support, and resilient cushions interposed between the end sections and the extended braces of the intermediate section.

ELWOOD COOKENBOO.